United States Patent [19]

Stewart

[11] 4,356,239
[45] Oct. 26, 1982

[54] OPEN AND SHORT CIRCUIT TEST APPARATUS

[75] Inventor: Jimmy L. Stewart, Clinton, Ind.

[73] Assignee: General Battery Corporation, Reading, Pa.

[21] Appl. No.: 226,060

[22] Filed: Jan. 19, 1981

Related U.S. Application Data

[62] Division of Ser. No. 108,470, Dec. 31, 1979, Pat. No. 4,282,292.

[51] Int. Cl.³ .................................................. H01M 14/00
[52] U.S. Cl. ........................................... 429/7; 429/93; 429/178
[58] Field of Search ...................................... 429/90-93, 429/7, 178

[56] References Cited

U.S. PATENT DOCUMENTS 3,695,939 10/1972 Buttke et al. ........................... 429/90
3,972,739 8/1976 Hammel ................................. 429/90

Primary Examiner—Charles F. Lefevour
Attorney, Agent, or Firm—Benasutti Associates, Ltd.

[57] ABSTRACT

An apparatus and method for the sequential testing of series connected lead-acid storage batteries for short circuits between plates of opposite polarity within a cell and for electrical continuity between cells of said battery is disclosed. The apparatus comprises power and control circuitry working in conjunction with a terminal block containing a plurality of pins which are connected to the intercell lugs on the positive and negative straps which when welded together form the intercell connections within the battery. Within this block, the pins are partially wired together so that if there is complete continuity of the intercell welds a continuous electrical circuit is formed. Midway in the electrical wiring is a blocking diode which acts to permit the passage of a DC test current in only one direction. If a positive polarity voltage is impressed on the cathode side of the diode, current will only flow if there is a short circuit between plates of opposite polarity within the cell. If a positive polarity voltage is impressed on the anode side of the diode, current will only flow if there is continuity through the intercell welds. The apparatus further contains sequencing means adapted to control said polarity changes within said apparatus. Alarm means adapted to indicate to an operator the presence of either or short or open circuitry is also provided as are enabling means to control a reject mechanism which will remove batteries having such conditions from the production stream for either repair or scrap. The apparatus can be adapted for use either by itself or in conjunction with other battery production line equipment.

7 Claims, 2 Drawing Figures

OPEN AND SHORT CIRCUIT TEST APPARATUS

This is a division of application Ser. No. 108,470, filed Dec. 31, 1979 now U.S. Pat. No. 4,282,292.

BACKGROUND OF THE INVENTION

This invention generally relates to the testing of series connected cell assemblies of lead-acid storage batteries and in particular to the testing of such battery for short circuits between plates of opposite polarity within a cell and for electrical continuity between the cells of said battery.

In the manufacture of the usual multicelled lead-acid battery, the battery is assembled in a non-conductive case which is internally divided with a plurality of partitions depending upon the terminal voltage of the battery to be produced. For example, a standard 12 volt automotive battery has a non-conductive case which is divided into 6 separate cells by 5 such partitions. When the battery is assembled, each cell contains a plurality of interleaved positive and negative plates which after charging act to produce a voltage on the order of 2 volts. Thus, in order to form the 12 volt battery, these 6 cells must be connected together in series with the positive terminal of one cell being electrically connected to the negative terminal of an adjacent cell. In the newer types of automotive batteries, these connections are made by welding together lugs, one on either side of each cell partition through an aperture therein. At the ends of the series string are terminal post, one positive and one negative to which the external connections are made.

Two important criteria which should be determined after the plates have been assembled into the cells and the intercell electrical connections have been made are:

1. Whether there are any short circuits between plates of opposite polarity within a given cell; and
2. Whether or not there is electrical continuity as required between adjacent cells after appropriate electrical connections have been made.

A short circuit between plates of opposite polarity within a cell, would, of course, have a deleterious effect and quickly lead to a "dead" cell after charging. An open circuit on the series connection would produce an inoperative battery since, normally speaking, the only current path through the battery runs between the outside terminals which are located at the opposite ends of the series connection.

It is desirable to make the above recited short and open circuit tests before the battery cover is fastened to the container. Such detection of open and short circuits at this early stage would enable efficient repair, where possible, or eliminate the need for further processing where such repair proves to be impossible. One way of approaching this problem is to conduct the test with a dedicated test system which could be operated either by itself or in conjunction with other battery processing equipment, such as that used to conduct shear tests to detect weak welds after the intercell connections are made. However, no such system currently exits on the market. The subject invention is designed to correct this problem.

BRIEF DESCRIPTION OF THE INVENTION

Basically, the subject invention comprises an apparatus adapted for the sequential testing series connected cells of lead-acid storage battery for short circuits between plates of opposite polarity within a cell and for continuity of the intercell welds to make up the series connection. In its most basic conception, it comprises power and control circuitry working in conjunction with a terminal block containing a plurality of pins which are connected to the intercell lugs on the positive and negative straps which when welded together form the intercell connections within the battery. Within this block, the pins are partially wired together so that if there is complete continuity of the intercell welds, a continuous electrical circuit is formed.

Midway in the electrical wiring is a blocking diode which acts to permit the passage of DC test current in only one direction. If a positive polarity voltage is impressed on the terminal block so that it appears on the cathode side of the diode, the only path through which current can flow within the battery is through one or more short circuits between plates of opposite polarity within a cell. Absent such a condition, no current will flow. If the polarity of the voltage is reversed so that the positive polarity is impressed on the anode side of the diode, it will pass a current which will follow the internal wiring through the intercell welds, provided there is continuity within such welds.

The apparatus further contains sequencing means adapted to control the polarity changes so that it first tests for short circuits and then for intercell continuity. Alarm means adapted to indicate to an operator the presence of either a short or open circuit is also provided. The apparatus further contains enabling means to control a reject mechanism which will remove the batteries having such conditions from the production stream for either repair or scrap. Lastly, the apparatus can be adapted to be used in conjunction with other production line equipment and most appropriately with the shear test equipment which evaluates the physical quality of the intercell welds. For maximum reliability and lowest costs, mechanical relays are used to provide the necessary sequenced connections.

Thus, it can be seen that there has been provided an apparatus and method for testing electric storage batteries for short circuits between plates of opposite polarity within a cell and for electrical continuity of the intercell welds. The technique can be applied to batteries of all sizes and requires a minimum of manual operation.

It is a primary object of the subject invention to provide automatic means for actively testing multicelled lead-acid storage batteries for short circuits within the cells and open circuits between cells.

It is a further object to provide an apparatus which can be incorporated into a manufacturing line for automatic rejection of defective battery.

It is still a further object to provide an apparatus which will automatically indicate the presence of defective batteries.

It is still another object to provide an apparatus which is of low cost and is economical to operate.

Other and further objects of this invention will become obvious from the consideration of the detailed description, along with the drawings contained herein.

DETAILED DESCRIPTION OF THE INVENTION

Figure 1:
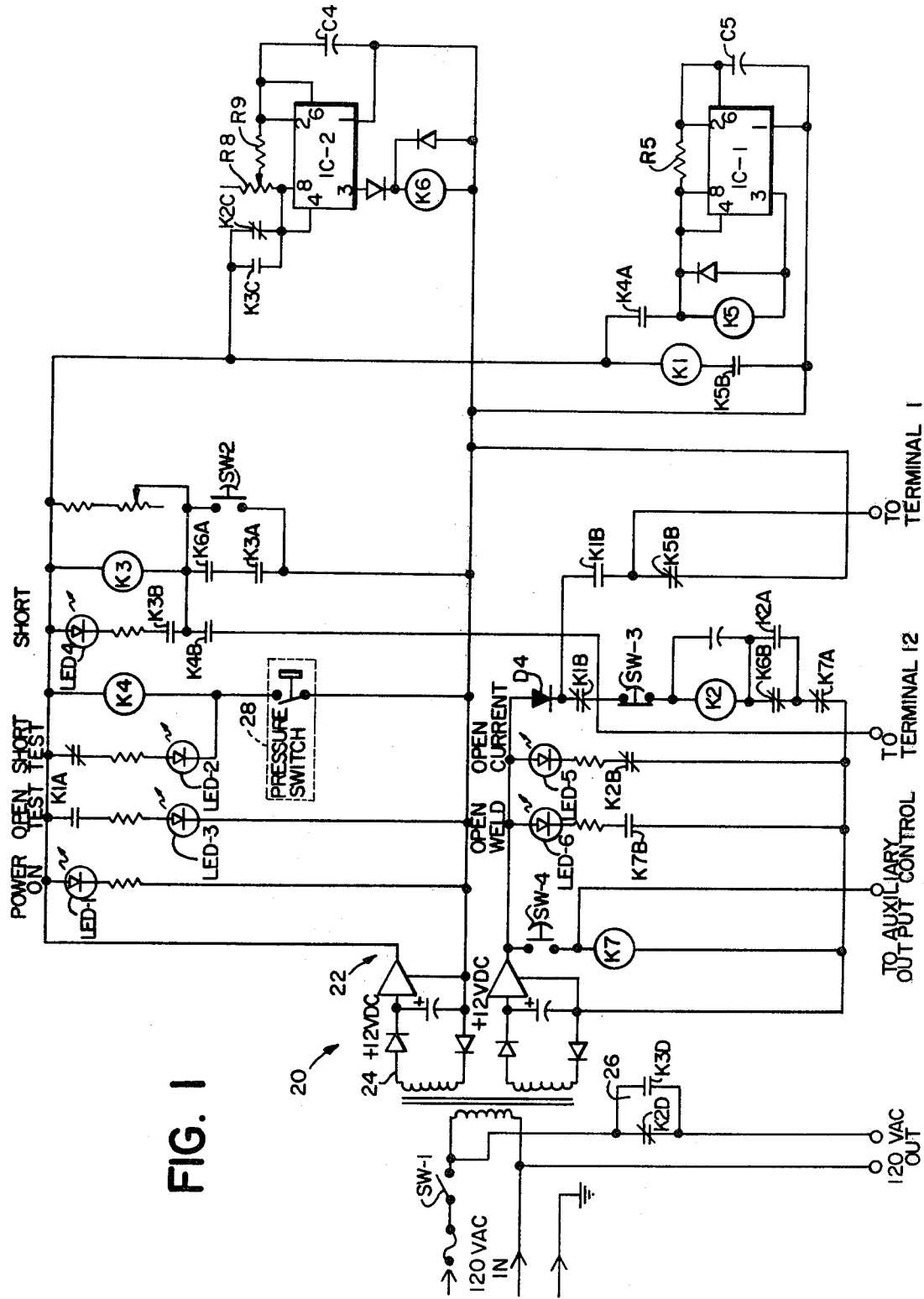
FIG. 1 is a circuit diagram showing one embodiment of the circuit forming this invention.

Referring now to FIG. 1, we see a circuit diagram for one embodiment 20 of the proposed invention.

The invention as described here is used in conjunction with a piece of production line equipment which performs a shear test on the intercell welds. This device has jaws which are lowered onto the battery and which make contact with the parallel connections of the positive and negative plates in each cell of the battery. It is intended to detect weak intercell welds by imposing a shear load on them so as to cause weak welds to separate and fail. However, the discussion of the invention as an adjunct to this device is not intended to foreclose the use of the invention either by itself or in conjunction with other pieces of production line equipment normally encountered in battery manufacture.

Figure 2:
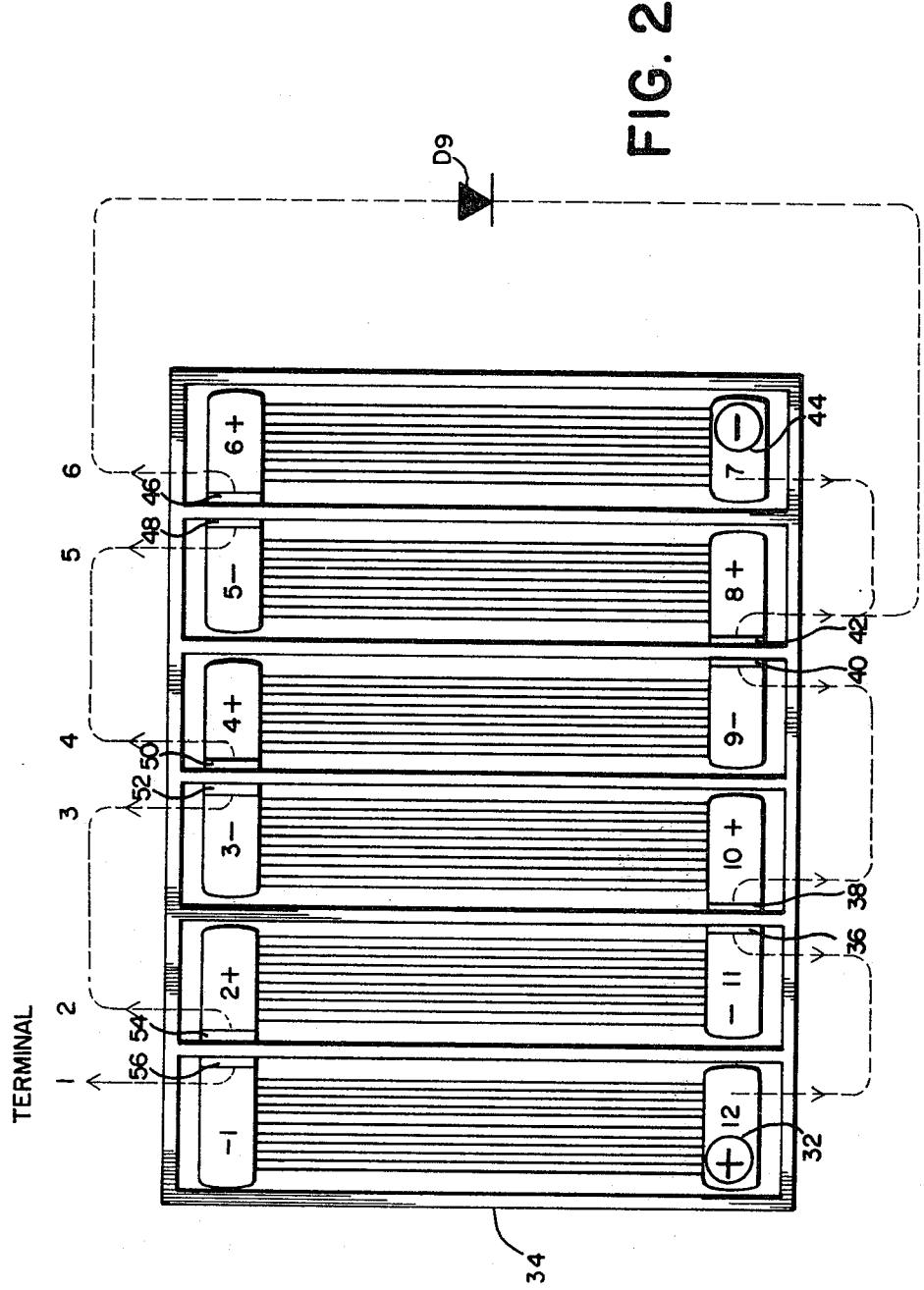
FIG. 2 is a top view of the circuit in the terminal block in this invention showing the internal wiring connections.

Returning now to FIG. 1, which should be viewed in conjunction with FIG. 2 as will herein below be explained, we see a schematic diagram of the circuit 22 forming the basis of this invention. The apparatus is powered by a 120 volt AC power source which is applied to one side of the power supply 24 through off/on power switch SW1. As configured, power supply 24 has two separate outputs both of them being 12 volts DC. Working in conjunction with power supply 24 is reject power supply 26 to a reject mechanism (not shown), the operation of which, as will be herein discussed below, is controlled either by normally closed relay contacts K2D and normally open relay contacts K3D.

When switch SW1 is closed, one leg of the dual DC output, after suitable filtering, is fed through LED-1 which, when lit indicates that system power is "on." The power in this leg further continues through the coils of relays K4 and K3 and through the normally closed contacts K1A through LED-2. However, no current will flow in any of these circuits until pressure switch 28 closes. The second leg of power supply 24, also after being suitably filtered, is fed through blocking diode D4, the normally closed contacts K1B, the normally closed "open current" test switch SW3 and the normally closed contacts K6B and K7B to energize relay K2. This, in turn, causes normally open contacts K2A to close, thus latching relay K2. At the same time, normally closed contacts K2B also open causing "open current" LED-5 to extinguish. Lastly, normally closed contacts K2C and K2D open which disables both IC2 and the reject power power supply 26. It should be noted that the operation of relay K2 at this time is independent of the internal conditions within the battery.

The system as described herein incorporates certain test features which allow the operator to determine that each of the separate functions to be performed will operate correctly once this test sequence has started. Thus, "short" switch SW2, when depressed, will provide an alternate conductive path for relay K3. As will herein below be described, when relay K3 is activated, normally open contacts K3B close and the "short circuit" alarm light LED-4 will turn on. Similarly, "open weld" switch SW4 when depressed will activate relay K7 which in turn causes normally open contacts K7B to close and cause the "open weld" LED-6 to illuminate. As will herein below be explained, the activation of SW4 also acts as a manual reject mechanism for any battery which is in the test apparatus. Lastly, opening normally closed switch SW3 will cause relay K2 to be deactived and close contacts K2B thus illuminating "open current" LED-5. Failure of any of these tests generally indicate a broken or disconnected wire in the system.

As noted above, the test sequence is initiated by the closing of pressure switch 28. In the embodiment described herein this is a part of a shear test unit (not shown) with which the current embodiment of the subject invention now operates. When the shearing jaws of the test unit are lowered onto the battery being tested and make positive contact with the intercell battery connections, their closure will cause pressure switch 28 to close and thus start the test sequence. As configured, the battery is first tested for short circuits therein and then for open intercell connections so the closure of pressure switch 28 enables relay K4 which closes normally open contacts K4A and K4B and starts the "short" test.

The closure of K4A triggers and resets delay timer IC1. As configured, this comprises a LM-555 or similar linear timing device with resistor R5 and capacitor C5 selected to provide a delay time on the order of 1.5 to 2 seconds. During this time, the output from pin 3 is "high", thus disabling relay K5 and relay K1. As a result of this, the "short test" light, LED-2 is illuminated through normally closed K1A. At the same time, pin 1 of terminal block 30 is isolated from the output of D4 by the opening of K1B and connected to the return of power supply 24 by the closure of K5B.

The closure of normally open contact K4B closes a current path through the coil of relay K3 to put a positive polarity voltage on pin 12 of terminal block 30 on lug 32 of battery 34. As shown in FIG. 2, terminal block 30 is partially wired internally so that this positive polarity voltage will also appear at series connected points pin 11 on lug 36, pin 10 on lug 38, pin 9 on lug 40, pin 8 on lug 42 and pin 7, 44 of battery 34. However, blocking diode D9 isolates this voltage from pins 6 on lug 46, 5 on lug 48, 4 on lug 50, 3 on lug 52, 2 on lug 54 and 1 on lug 56 on the other side of batter 34 so that no current can flow in this circuit. Therefore, if current is to flow between the two sides of the terminal strip, it can only do so if there are short circuit conditions exiting between parallel plates of opposite polarity in one or more of the cells of the battery. If such a condition is present, there wil then be continuity between pin 12 and 1 and current will therefore flow through normally closed contacts K5B to the return of power supply 24. This current flow causes relay K3 to be energized, closing the normally opening contacts K3B and causing the "short circuit" LED-4 to turn alarm light, LED-4 to turn on. At the same time, normally open contacts K3C and K3D close. K3C resets and triggers timing circuit IC2 and K3D enables reject power supply 26.

The "short" test is concluded after about 2 seconds when timer IC1 times out and pin 3 goes from "high" to "low." When this happens, a current path through the coil of relay K5 is established to the return line of power supply 24, thus actuating it. As a result, normally closed contacts K5B open thus isolating pin 1 of terminal block 30 from the return line of power supply 24 and actuating relay K1. The activation of relay K1 causes several simultaneous effects. First, the normally open contacts of K1A close which turns off the "short test" light LED-2 to signal the end of the test and turns on the "open test" light LED-3.

Virtually simultaneously with the closing of contacts K5B, K1B also opens thus isolating the positive output from blocking diode D4 from pin 12 of terminal block 30. Contact with the return side of the power supply from pin 12 is established through SW3. The "open test" itself is enabled by K5B and K1B acting together to direct positive polarity voltage from blocking diode D4 to pin 1 of terminal block 30. If the battery passes this test, it passes out of the test system at the conclusion of the shear test for further manufacturing operations.

As currently configured, the test system will conduct an open circuit test whether there are short circuits present or not. This is done by timing circuit IC2. In the event no short circuits are present, K3C stays open and IC2 is not activated at this time. If, however, short circuits are present, relay K3 is activated and normally opened contact K3C close. This resets and triggers timing circuit IC2 in which R8 and R9 and capacitor C4 are chosen to give a time period on the order of 6 to 8 seconds during which the outut is "high" when actuated relay K6. This provides enough time for the shear test functions to be performed and the battery to pass out of the test system to a point where reject power supply 26 can be activated. The activation of relay K6 causes normally opened pins K6A to close which effectively locks relay K3 in operation and keeps normally open contacts K3A closed. It also keeps normally open contacts K3D closed. Under these conditions, the reject mechanism is enabled to remove the battery from the production line at the conclusion of the test operations.

The opening of normally closed contacts K1B acts to put the battery in parallel with switch SW3 and the positive polarity output coming from relay K4 is divided between the battery and K2 at the junction point just below the output of normally closed contacts K1B. With a positive polarity on pin 1 thus on the anode side of blocking diode D9, there is now no circuit impediment to a current flow in terminal block 30 as long as there is continuity in the intercell weld. The passage of this current also keeps relay K2 active. Under these circumstances, relay K2 remains actuated and normally closed open contacts K2B causing "open current light" LED-5 to remain off, and keeping the contacts K2D open. If, however, an open circuit condition exists, this situation will change. At this point, the positive polarity voltage coming through blocking diode D4 will be cut off and K2 will drop out. This will close contacts K2B, K2C and K2D which in turn cause "open current" light LED-5 to turn on, timer IC2 to be triggered and reject mechanism 26 to be enabled.

It was noted above that the battery completes all of its tests, i.e., the shear test, the short test and the open test before it is physically removed from the battery processing line. It was also noted above that either a "short" test result, which would close K3D, or an "open" test result, which would close K2D, will enable the reject mechanism. However, rejection does not itself actually occur until the battery passes out of the machine at which point and time circuitry within the shear test system turns on the actual reject mechanism. The activation of IC2 at this time provides the time necessary for this to happen. Absent this type of actuation, the battery stays in the production line.

There remains one further aspect of the embodiment. If the welds shear in the jaws, relay K7 is activated through the auxiliary input. When this happens, K7A opens, shutting off K2 and triggering IC2 and the reject cycle as described herein above. At the same time K7B closes, turning on the "open weld" light LED-6. Manual initiation of rejection at any time is possible simply by closing normally open switch SW4. This might be used if a rejectable feature is observed by the machine operator.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. For a multicelled storage battery, wherein each cell is comprised of a plurality of interleaved positive and negative plates, said plates having upstanding lugs arranged so that each positive lug is along one side of said cell and each negative lug is along an opposite side of said cell, wherein all of said positive lugs are connected by a first conductive strap having a connector lug associated therewith and all of said negative lugs are connected by a second conductive strap having a connector lug associated therewith, said cells being alternately arranged within said battery so that the first conductive strap lug of one cell is adjacent to the second conductive strap lug of an adjoining cell, said cells being connected in series by welding together the first strap lug in one cell to the second strap lug in the adjoining cell, and further said battery comprising an external terminal at each end of said series, an apparatus for testing said batteries for short circuits between plates of opposite polarity within a cell and for electrical continuity between the cells of said battery comprising:
   a. power means,
   b. terminal means adapted for placement on said battery and including circuit means forming a series electrical connection with the power means, the positive and negative strap lugs along one side of the battery, and the positive and negative strap lugs along the other side of said battery;
   c. control means associated with the circuit means of said terminal means so that the lugs along one side of the battery are electrically separated from the lugs along the other side of said battery, and further adapted to allow the passage of current through said series electrical connection substantially in only one direction; and
   d. switch means associated with said power means and adapted to first apply a positive voltage across the circuit means so that the flow of current is opposed by said control means, thus preventing current from flowing through said series electrical connection, unless there is a short circuit between one or more parallel plates of opposing polarity within a cell, and secondly to reverse polarity of the applied voltage so that a current will be permitted to flow through said control means and said series electrical connection if there is continuity in the intercell welds of said battery.

2. The apparatus of claim 1 wherein said control means is a blocking diode placed within the circuit of said terminal means.

3. The apparatus of claim 1 wherein said terminal means is a terminal block having a plurality of contact pins adapted to make electrical contact with the external terminals of said battery and its associated strap lugs.

4. The apparatus of claim 3 further comprising alarm means adapted to indicate the presence of short circuits or open circuits.

5. The apparatus of claim 4 further comprising reject means adapted to respond to the presence of short or open circuits and remove said battery from the production line.

6. For a multicelled storage battery, wherein each cell is comprised of a plurality of interleaved positive and negative plates, said plates having upstanding lugs arranged so that each position lug is along one side of said cell and each negative lug is along an opposite side of said cell, wherein all of said positive lugs are connected by a first conductive strap having a connector lug associated therewith and all of said negative lugs are connected by a second conductive strap having a connector lug associated therewith, said cells being alternately arranged within said battery so that a first conductive strap lug of one cell is adjacent to the second conductive strap lug of an adjoining cell, said cells being connected in series by welding together the first strap lug in one cell to the second strap lug in the adjoining cell, and further said battery comprising an external terminal at each end of said series, a terminal block for use in testing multicelled storage batteries in conjunction with a testing apparatus to detect short circuits between plates of opposite polarity within a cell and to detect a lack of electrical continuity between the cells of said battery comprising:
 a. a frame adapted for placement onto said battery;
 b. a plurality of pins attached to said frame and adapted to make electrical contact with all the positive and negative strap lugs within the cells of said battery;
 c. wiring interconnecting the pins to form a series connection along each side of said battery;
 d. control means associated with said wiring so that the pins along one side of said frame are electrically separated from the pins along the other side of said frame, said control means being adapted to permit the flow of electrical current through said wiring in only one direction; and
 e. attachment means for connecting the wiring associated with said frame to said testing apparatus.

7. The apparatus of claim 6 wherein said control means is a blocking diode.

* * * * *